United States Patent
Kato et al.

(10) Patent No.: US 6,984,068 B2
(45) Date of Patent: Jan. 10, 2006

(54) LINEAR GUIDE BEARING APPARATUS

(75) Inventors: Soichiro Kato, Gunma (JP); Nobushide Kurachi, Gunma (JP)

(73) Assignee: NSK Ltd., Tokyo (JP)

( * ) Notice: Subject to any disclaimer, the term of this patent is extended or adjusted under 35 U.S.C. 154(b) by 123 days.

(21) Appl. No.: 10/291,651

(22) Filed: Nov. 12, 2002

(65) Prior Publication Data

US 2003/0091248 A1 May 15, 2003

(30) Foreign Application Priority Data

Nov. 13, 2001 (JP) .................... P. 2001-348014
Feb. 18, 2002 (JP) .................... P. 2002-040633

(51) Int. Cl.
*F16C 29/06* (2006.01)

(52) U.S. Cl. .................... 384/43; 384/45
(58) Field of Classification Search ............ 384/43–45, 384/48, 49
See application file for complete search history.

(56) References Cited

U.S. PATENT DOCUMENTS

| | | | | |
|---|---|---|---|---|
| 4,692,039 A | * | 9/1987 | Teramachi | 384/45 |
| 4,898,478 A | * | 2/1990 | Osawa | 384/45 |
| 5,104,238 A | * | 4/1992 | Kasai | 384/45 |
| 5,553,945 A | * | 9/1996 | Blaurock et al. | 384/45 |
| 5,755,516 A | * | 5/1998 | Teramachi et al. | 384/45 |
| 5,927,858 A | * | 7/1999 | Agari | 384/45 |
| 6,126,319 A | * | 10/2000 | Toyota et al. | 384/43 |

FOREIGN PATENT DOCUMENTS

| | | |
|---|---|---|
| EP | 0 732 311 A1 | 9/1996 |
| EP | 1 022 478 A1 | 7/2000 |
| JP | 7-158715 | 6/1995 |

* cited by examiner

*Primary Examiner*—Thomas R. Hannon
(74) *Attorney, Agent, or Firm*—Sughrue Mion, PLLC

(57) ABSTRACT

A linear guide apparatus has a guide rail including rolling element rolling grooves formed in the side surfaces thereof so as to extend in the axial direction thereof; a slider including rolling element rolling grooves respectively opposed to the rolling element rolling grooves of the guide rail and mounted on the guide rail so as to be movable in the axial direction with respect to the guide rail; and, a plurality of rolling elements rollably interposed between the rolling element rolling grooves of the guide rail and the rolling element rolling grooves of the slider, wherein each of the portions, where the groove surfaces of the rolling element rolling grooves of either the guide rail or the slider and the outer surfaces thereof cross each other, is formed as a curved surface, whereby the groove surface and the outer surface are allowed to continue smoothly with each other.

6 Claims, 8 Drawing Sheets

LINEAR GUIDE BEARING APPARATUS

BACKGROUND OF THE INVENTION

1. Field of the Invention

The present invention relates to a linear motion guide bearing apparatus which is used in an ordinary industrial machine or in a delivery apparatus and, in particular, to a guide rail or a slider which is a composing part of the linear motion guide bearing apparatus.

2. Description of the Related Art

Generally, a linear motion guide bearing apparatus, as shown in FIG. 8, as composing parts thereof, comprises a guide rail 1 extending in a given direction and a slider 2 crossingly mounted on the guide rail 1 so as to be movable with respect to the guide rail 1 along the guide rail 1.

In the two side surfaces of the guide rail 1, there are formed rolling element rolling grooves 3 which respectively extend in the axial direction of the guide rail 1. Also, in the inner surfaces of the slider 2 as well, there are formed rolling element rolling grooves 4 which are respectively disposed opposed to the rolling element rolling grooves 3. And, within a load rolling passage which is formed between the mutually opposed rolling element rolling grooves 3, 4, there are inserted a plurality of rolling elements (such as rollers or balls).

In FIG. 8, reference character 6 designates a return passage and 7 stands for an end cap.

FIG. 9 is a section view of a conventional guide rail 1, when it is viewed from the axial direction (extending direction) of the rolling element rolling groove 3. And, FIG. 10 is a section view of a conventional slider 2, when it is viewed from the axial direction (extending direction) of the rolling element rolling groove 4.

Each of the rolling element rolling grooves 3, 4 has a substantially circular section shape; and, boundary portions A, B, which are formed between land surfaces existing continuously with the two sides of the rolling element rolling grooves 3, 4, are respectively formed in a shape having an angle formed by the mutual intersection of an arc and a straight line (which is hereinafter sometimes referred to as an edge shape). By the way, in the rolling element rolling grooves 3, 4, in some cases, there can be formed such a relief as shown in FIG. 8.

In the case of the guide rail 1 shown in FIG. 9, the upper-side rolling element rolling grooves 3 are formed in the corner portions between the side surfaces and upper surface of the guide rail 1. In the case of the present rolling element rolling grooves 3, the section shape thereof provides a substantially ¼ arc shape; and, the respective boundary portions A between the land surfaces (side surfaces and upper surface) existing continuously with the present rolling element rolling grooves 3 and the present rolling element rolling grooves 3 also provide an edge shape having an angle formed by the intersection between an arc and a straight line.

However, when the linear motion guide bearing is in operation, in case where there exists a clearance between a load rolling passage and the half-arc-shaped circulation passage formed in a rolling element circulation part such as an end cap, a rolling element, when passing through the clearance, can shift from its normal passage and interfere with the land portion.

At the then time, in case where the rolling element 5 is higher in hardness than the guide rail 1, for example, the guide rail 1 is made of metal and the rolling element 5 is made of ceramic, there arises a problem that the boundary portion A softer than the rolling element 5 is easy to wear.

That is, as in the above-mentioned conventional structure, when the boundary portions A, B are respectively formed in an edge shape, in case where there occurs such a load state in which the rolling element 5 is pressed against the boundary portions A, B, since the contact area of the rolling element 5 with the boundary portions A, B is small, the maximum contact pressure increases. As a result of this, the boundary portions A, B are easy to wear. Depending on the progress of such wear, there is a fear that such wear can have an ill effect on the linear motion accuracy of the slider 2.

This problem become obvious especially in such a using condition that the slider 2 must be moved at a high speed with respect to the guide rail 1, or the slider 2 must be positioned with high precision.

Especially, since the moving speed of the rolling element has been enhanced, when a corner portion exists in the land portion 2b (see FIG. 11), in the case of the guide rail 2 made of steel, there arises a problem that the rolling element 5 and land portion 2b are easy to flake.

Also, in case where the guide rail 2 is made of ceramic material, since the guide rail 2 is hard, the surface of the rolling element 5 can be damaged; and, because the ceramic material is fragile material, a crack can be caused in the land portion 2b.

On the other hand, when the moving speed of the rolling element 5 is low, in the case of the guide rail 2 made of steel, the surface of the rolling element 5 and the groove surface of the rolling element rolling groove 4 of the guide rail 2 are worn due to the rolling motion of the rolling element 5 and the roughness of these surfaces is thereby reduced (the surfaces are smoothed), which makes it hard for the surfaces to wear any further.

However, in case where the guide rail 2 is made of ceramic material, since the guide rail 2 is much harder than the rolling element 5, there hardly arises the possibility that the groove surface of the rolling element rolling groove 4 of the guide rail 2 can be worn due to the rolling motion of the rolling element 5 and the roughness of the groove surface can be thereby reduced (the groove surface can be smoothed). Therefore, as the linear guide apparatus is operated, the rolling element 5 continues to wear. As a result of this, in case where the preload amount of a linear guide apparatus is small, especially, in the case of a small-size linear guide apparatus, the rigidity of the linear guide apparatus is lowered due to shortage of the preload, so that the durability of the linear guide apparatus is reduced.

SUMMARY OF THE INVENTION

The present invention aims at eliminating the above drawbacks found in the conventional structure. Accordingly, it is an object of the invention to provide such a composing part for incorporation into a linear guide bearing apparatus that can reduce the progress of wear of the boundary portions between the rolling element rolling grooves and land surfaces.

In addition to this, the present invention aims at eliminating the above-mentioned drawbacks found in the conventional linear guide apparatus. Accordingly, it is an object of the invention to provide a linear guide apparatus which can reduce damage of the rolling element rolling grooves of a guide rail and wear of rolling elements and is thereby able to provide excellent durability.

In attaining the above object, according to a first aspect of the invention, there is provided that A linear guide apparatus, comprising: a guide rail including rolling element rolling grooves formed in the side surfaces thereof so as to extend in the axial direction thereof; a slider including rolling element rolling grooves respectively opposed to the rolling element rolling grooves of the guide rail and mounted on the guide rail so as to be movable in the axial direction with respect to the guide rail; and, a plurality of rolling elements rollably interposed between the rolling element rolling grooves of the guide rail and the rolling element rolling grooves of the slider, wherein each of the portions, where the groove surfaces of the rolling element rolling grooves of either the guide rail or the slider and the outer surfaces thereof cross each other, is formed as a curved surface, whereby the groove surface and the outer surface are allowed to continue smoothly with each other.

It is preferable that a linear guide apparatus as set forth in the first aspect of the present invention, wherein the groove surfaces of the rolling element rolling grooves and the outer surfaces are formed on the guide rail. In addition to this, It is preferable that a linear guide apparatus as set forth in the above construction, wherein the guide rail is made of ceramic material.

According to the present structure, not only a land portion to be formed in the portion of the guide rail where the groove surface of the rolling element rolling groove of the guide rail and the outer surface of the guide rail cross each other but also the rolling element are hard to be damaged. Especially, the present structure is ideal when the guide rail is made of ceramic material.

Next, according to a second aspect of the invention, there is a linear guide apparatus as set forth in the first aspect of the present invention, wherein the center line average roughness Ra in the rolling element rolling groove right-angles direction of the portion of the guide rail ranging from the portion of the rolling element rolling groove of the guide rail to be contacted with the rolling element up to the boundary portion between the outer surface of the guide rail and the curved surface is set for 0.1 $\mu$m or less.

In this case, since the wear of the rolling element involved with the operation of the linear guide apparatus can be reduced, the durability of the linear guide apparatus can be enhanced. In case where the center line average roughness Ra is larger than 0.1 $\mu$m, the wear of the rolling element involved with the operation of the linear guide apparatus is large, which raises a fear that the durability of the linear guide apparatus can be insufficient.

It is preferable that wherein the groove surfaces of the rolling element rolling grooves and the outer surfaces are formed on the slider.

It is preferable that hardness of the groove surfaces of the rolling element rolling grooves and the outer surfaces are formed softer than that of the rolling elements.

It is preferable that the rolling elements are made of ceramic material, and the groove surfaces of the rolling element rolling grooves and the outer surfaces are made of metal.

DETAILED DESCRIPTION OF THE PREFERRED EMBODIMENTS

Next, description will be given below of an embodiment of a linear guide bearing apparatus according to the invention.

Figure 1:
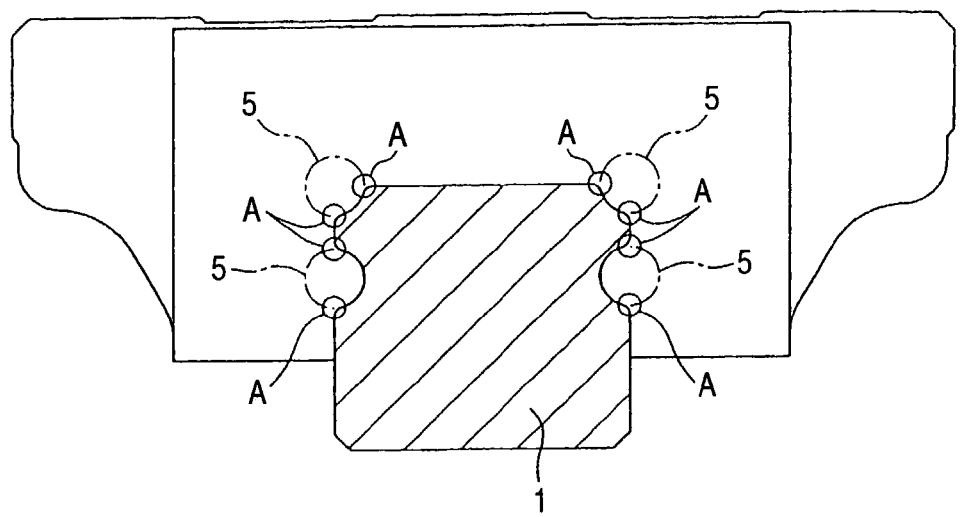
FIG. 1 is a section view of a guide rail according to an embodiment of the invention.
Figure 2:
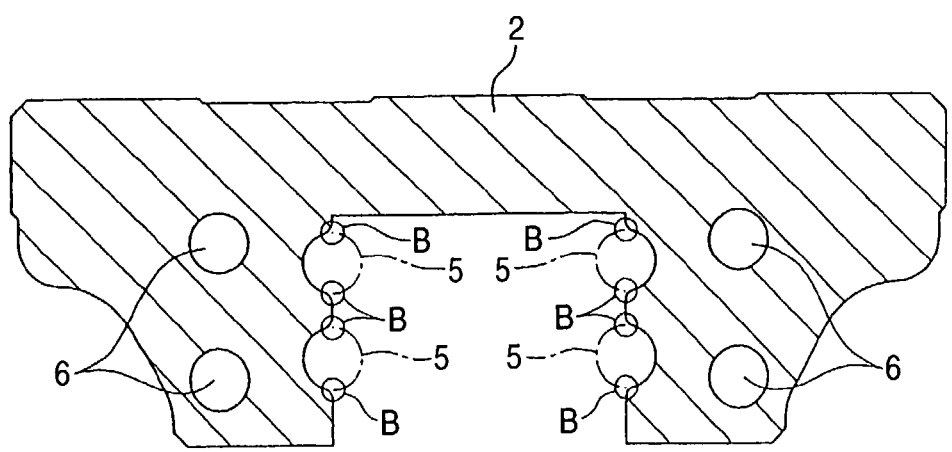
FIG. 2 is a section view of a slider according to an embodiment of the invention.

FIG. 1 is an explanatory view of a guide rail 1 which is one of the composing parts of a linear guide bearing apparatus according to the present embodiment. FIG. 2 is an explanatory view of a slider 2 which is also one of the composing parts of a linear guide bearing apparatus according to the present embodiment.

Figure 8:
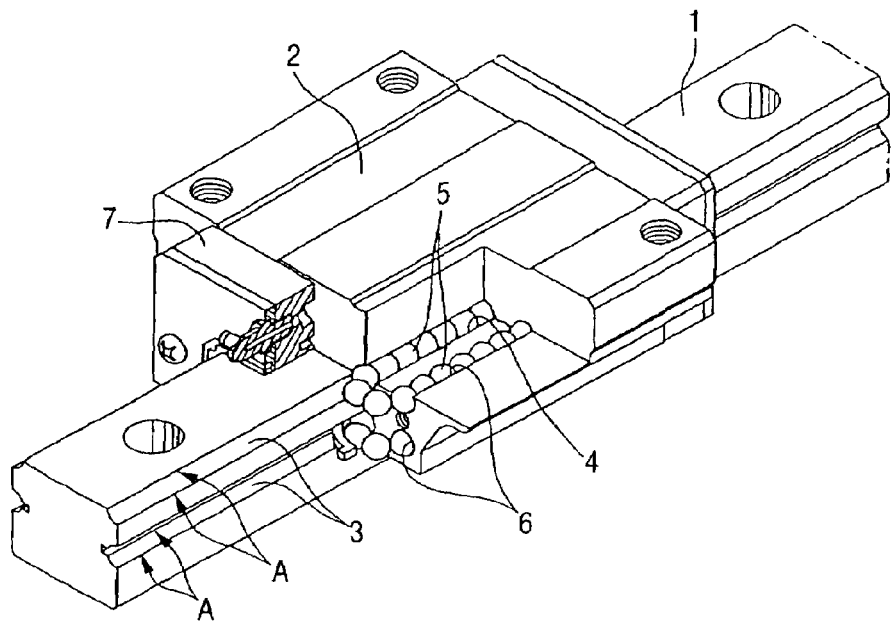
FIG. 8 is a partially broken perspective view of an embodiment of a linear guide bearing apparatus according to the invention.
Figure 9:
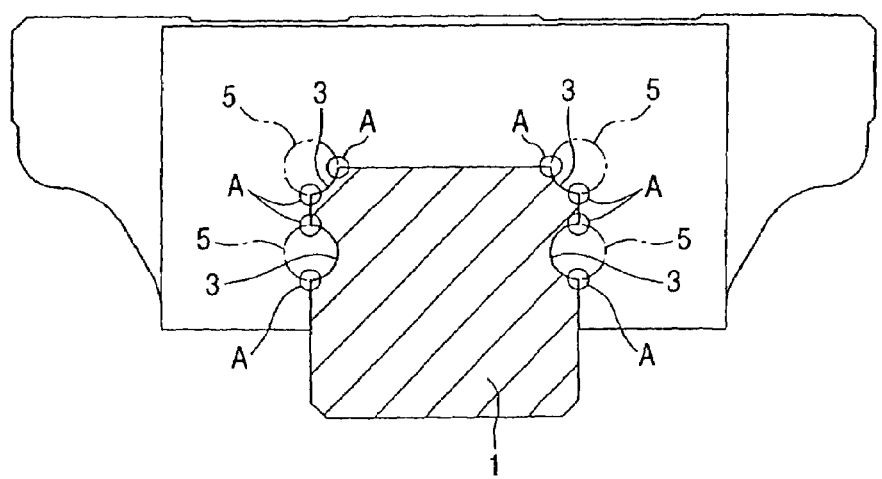
FIG. 9 is a section view of a conventional guide rail.
Figure 10:
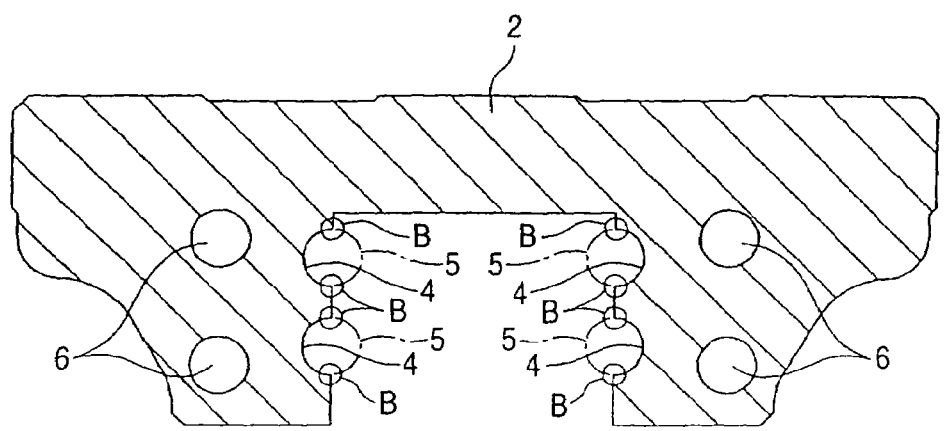
FIG. 10 is a section view of a conventional slider.
Figure 11:
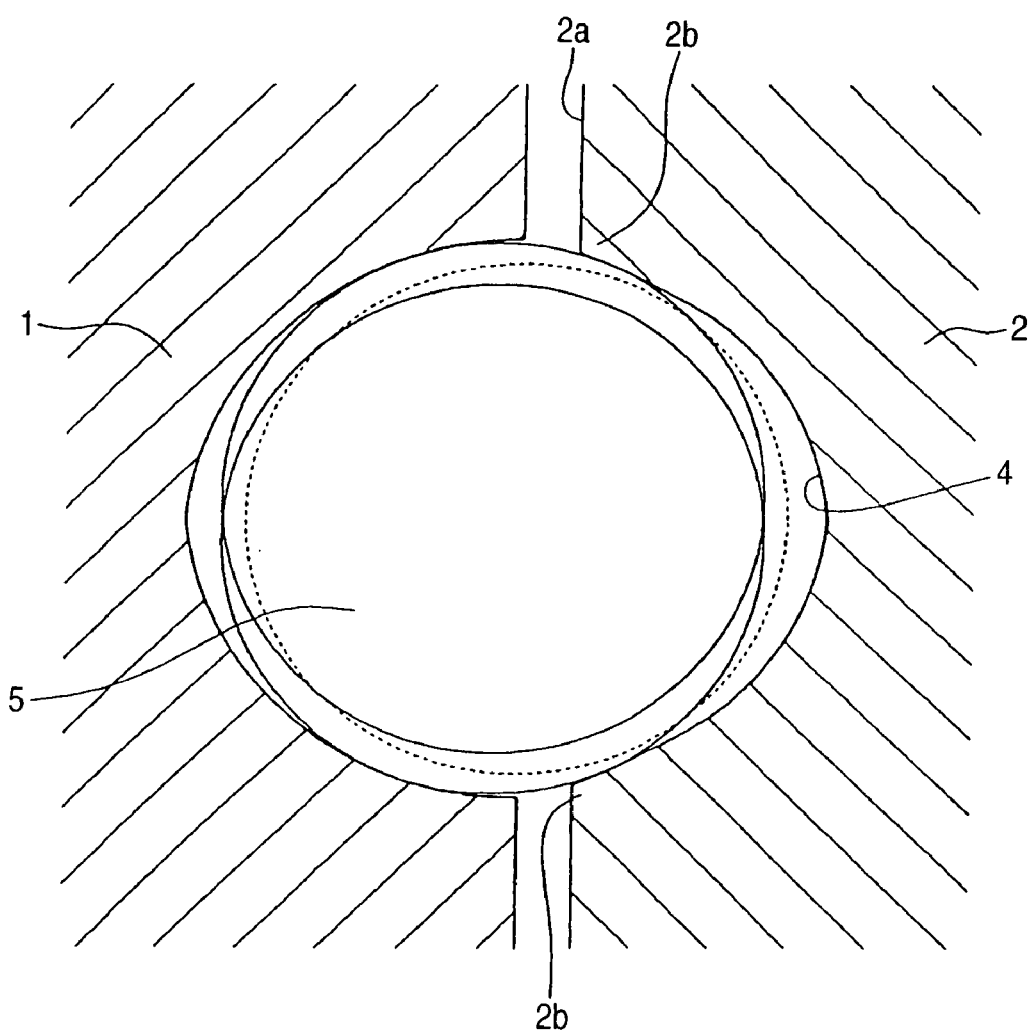
FIG. 11 is a partially enlarged section view of the main portions of a conventional linear guide apparatus.

The basic structure of the guide rail 1, as shown in FIG. 1, is similar to the above-mentioned conventional guide rail shown in FIG. 8; and, the guide rail 1 extends in a given direction and includes two rolling element rolling grooves 3 in each of the right and left surfaces thereof.

However, the boundary portions A between the rolling element rolling grooves 3 and the land surfaces (side surfaces and upper surface) existing continuously with the present rolling element rolling grooves 3 are respectively worked and rounded so that they have an R.

Also, the basic structure of the slider 2, as shown in FIG. 2, is similar to the above-mentioned conventional slider; and, the slider 2 includes an inner peripheral surface having such a U-shaped section as allow the slider 2 to be crossingly mounted on the guide rail 1 and, in the present inner peripheral surface, there are formed rolling element rolling grooves 4 which are respectively disposed opposed to the rolling element rolling grooves 3 of the guide rail 1.

The boundary portions B between the rolling element rolling grooves 4 and the land surfaces (the inner peripheral surface portions) existing continuously with the rolling element rolling grooves are respectively worked and rounded so that they have an R.

And, the guide rail 1 and slider 2 are used to construct the linear guide bearing apparatus. That is, the slider 2 is crossingly mounted on the guide rail 1 and, at the same time, the mutually opposed rolling element rolling grooves 3, 4 cooperate together in forming a load rolling passage. The two end portions of the load rolling passage are respectively allowed to communicate, through semi-arc-shaped circulation passages formed in rolling element circulation parts such as end caps, with rolling element return passages 6 which are respectively formed in the slider 2. The load rolling passage, circulation passages and rolling element return passages 6 cooperate together in forming an endless circulation passage and, in the endless circulation passage, there are disposed a plurality of rolling elements 5.

And, in the present embodiment, the rolling element 5 is made of ceramic, while the guide rail 1 and slider 2 are made of metal such as bearing steel, that is, the rolling element 5 is made of material which is higher in hardness than that of the guide rail 1 and slider 2, whereby there is provided a linear guide bearing apparatus which can reduce the wear of the rolling element 5. By the way, the above-mentioned material combination is not limitative and other type of material combination is also possible, provided that the material of the rolling element 5 is higher in hardness than that of the guide rail 1 and slider 2.

The above-mentioned linear guide bearing apparatus can be operated in the following manner: that is, the slider 2 can be moved with respect to the guide rail 1 along the guide rail 1 by an actuator such as a ball screw and, with such relative movement of the slider 2, the rolling element 5 is allowed to roll within the endless circulation passage.

In the above operation of the liner motion guide bearing, in case where there exists a clearance between the load rolling passage and the half-arc-shaped circulation passage formed in a rolling element circulation part such as an end cap, the rolling element, when passing through the clearance, can shift from its normal passage and interfere with the land portion. However, according to the present embodiment, the boundary portions A, B are rounded; and, therefore, when compared with the conventional edge-shaped boundary portions, the contact area between the rolling element 5 and boundary portions A, B increases, that is, the maximum contact pressure decreases, thereby being able to delay or reduce the progress of the wear of the boundary portions A, B.

This makes it possible to maintain the linear motion accuracy of the linear guide bearing apparatus for a long period of time.

Here, the above-mentioned embodiment is an embodiment in which the invention is applied to both of the guide rail 1 and slider 2 which are the composing parts of a linear guide bearing apparatus. However, the invention can also be applied to only one of the two composing parts.

Also, in the above-mentioned embodiment, description has been given on the assumption that a linear guide bearing apparatus is an apparatus of a type in which the section of the guide rail 1 has a substantially rectangular shape and the slider 2 is crossingly mounted on the guide rail 1 and is restricted so as to be shiftable in the axial direction of the guide rail 1. However, the invention is not limited to this. For example, the invention can also be applied to the slider 2 and guide rail 1 of a linear guide bearing apparatus of another type, such as a linear guide bearing apparatus of a type in which the section of a guide rail has a substantially circular shape and the basic shape of a slider is a cylindrical shape.

Figure 3:
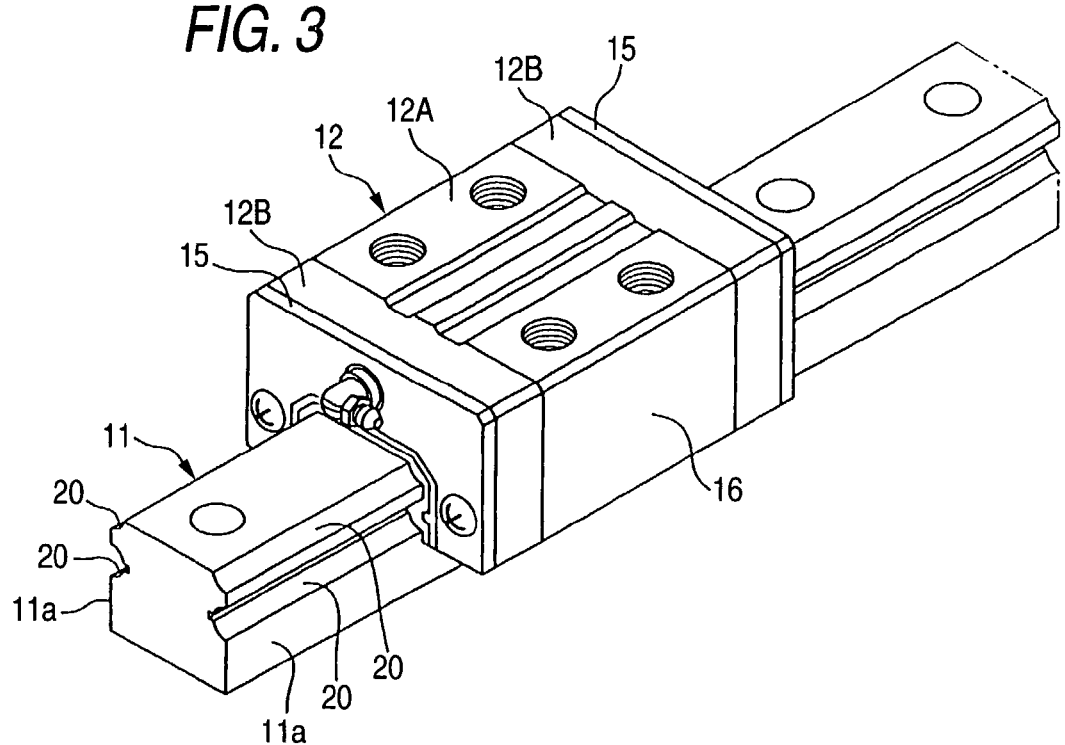
FIG. 3 is a perspective view of an embodiment of a linear guide apparatus according to the invention.
Figure 4:
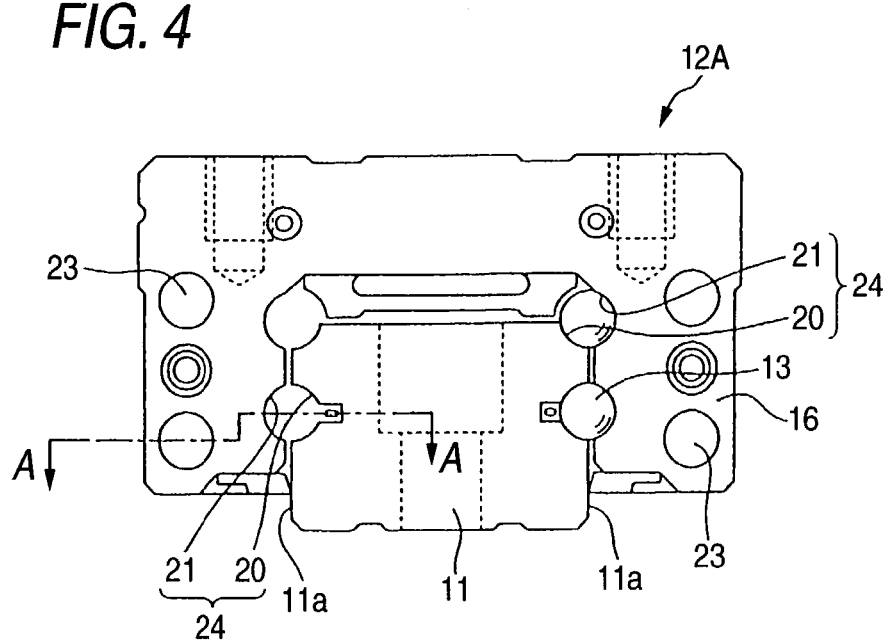
FIG. 4 is a front view of the linear guide apparatus shown in FIG. 3, when it is viewed from the axial direction thereof.
Figure 5:
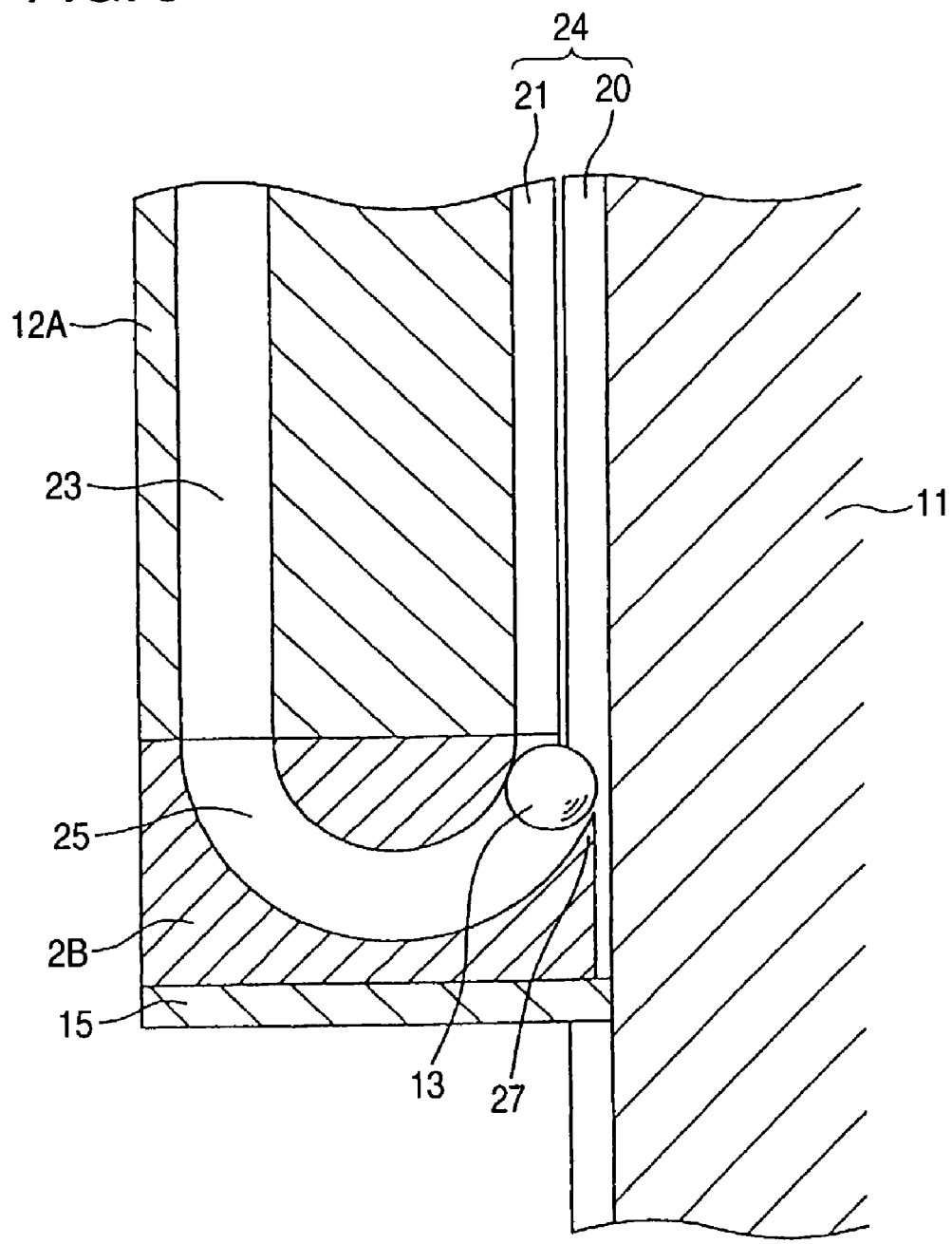
FIG. 5 is a section view taken along the line A—A shown in FIG. 4.
Figure 6:
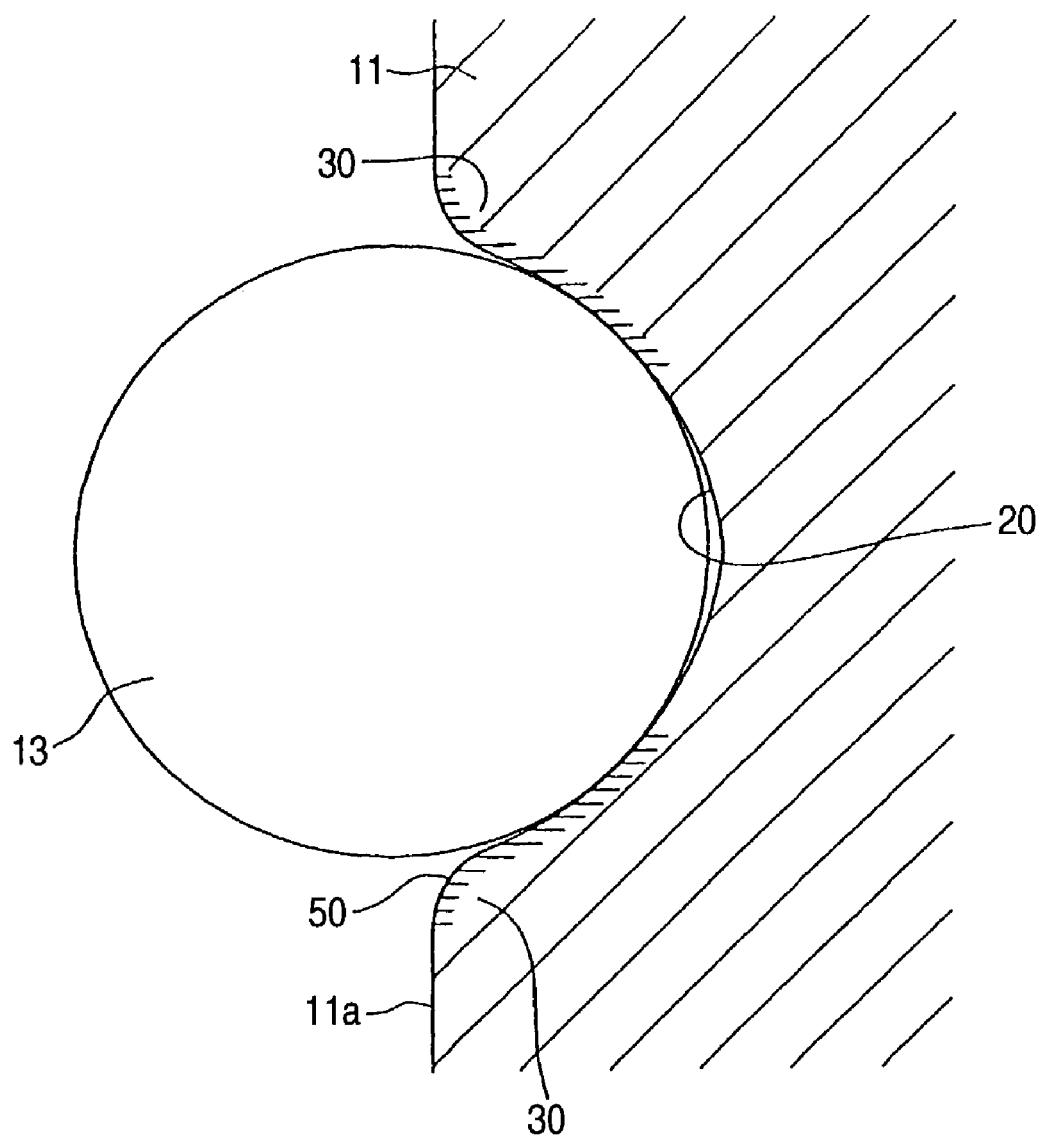
FIG. 6 is a partially enlarged section view, in which the main portions of the linear guide apparatus shown in FIG. 3 are enlarged.

Now, description will be given below in detail of an embodiment of a linear guide apparatus according to the invention with reference to the accompanying drawings. FIG. 3 is a perspective view of an embodiment of a linear guide apparatus according to the invention, and FIG. 4 is a front view of the linear guide apparatus shown in FIG. 3 when it is viewed from the axial direction thereof (however, end caps are omitted in this figure). Also, FIG. 5 is a section view taken along the line A—A, and FIG. 6 is a partially enlarged section view in which the rolling element rolling groove of a guide rail and a rolling element are shown in an enlarged manner.

Firstly, description will be given below of the structure of an embodiment of a linear guide apparatus according to the invention.

On a guide rail 11 which extends in the axial direction of the present linear guide apparatus and has a substantially rectangular-shaped cross section, there is assembled a slider 12 having a substantially U-shaped cross section in such a manner that it is movable with respect to the guide rail 11 in the axial direction thereof.

In the ridge portions of the guide rail 11 where the upper surface of the guide rail 11 and the two side surfaces 11a, 1a thereof cross each other, there are formed rolling element rolling grooves 20, 20 each consisting of a recessed groove which extends in the axial direction of the present guide rail 11 and has a substantially ¼-arc-shaped section; and, in the intermediate portions of the two side surfaces 11a, 1a of the guide rail 11, there are formed rolling element rolling grooves 20, 20 each consisting of a recessed groove which extends in the axial direction of the present guide rail 11 and has a substantially semicircular-shaped section.

Also, the slider 12 comprises a slider main body 12A and two end caps 12B, 12B respectively removably mounted on the two end portions of the slider main body 2 in the axial direction thereof; and, on the two end portions of the slider 12 (on the end faces of the respective end caps 12B), there are mounted two side seals 15, 15 which are used to seal two openings respectively formed in two clearances existing between the guide rail 11 and slider 12.

Further, in the corner portions of the inner side surfaces of the two sleeve portions 16, 16 of the slider main body 12A, there are formed rolling element rolling grooves 21, 21 which are respectively opposed to the rolling element rolling grooves 20, 20 of the guide rail 11 and have a substantially semicircular-shaped section; and, in the central portions of the inner surfaces of the two sleeve portions 16, 16, there are formed rolling element rolling grooves 21, 21 respectively opposed to the rolling element rolling grooves 20, 20 of the guide rail 11 and having a substantially semicircular-shaped section.

And, the rolling element rolling grooves 20, 20, 20, 20 of the guide rail 11 and the rolling element rolling grooves 21, 21, 21, 21 of the two sleeve portions 16, 16 cooperate together in forming rolling element rolling passages 24, 24, 24, 24 each having a substantially circular-shaped section, while these rolling element rolling passages 24 respectively extend in the axial direction of the present guide rail 11 and slider 12. By the way, the number of lines of rolling element rolling grooves 20, 21 to be formed in the guide rail 11 and slider 12 is not limited to two on each side but, for example, the number may be one or three or more on one side.

Further, in the upper and lower portions of the large-thickness portions of the two sleeve portions 16, 16 of the slider main body 12A of the slider 12, there are formed rolling element return passages 23, 23, 23, 23 respectively consisting of through holes each of which extends in parallel to its associated rolling element rolling passage 24, penetrates through its associated portion of the large-thickness portion in the axial direction of the slider, and has a circular-shaped section.

On the other hand, as shown in FIG. 5, in the case of the end caps 12B, 12B each of which has a substantially U-shaped section, in the contact surface (back surface) thereof to be contacted with the slider main body 12A, there are formed half-doughnut-shaped curved passages 25 which allow the rolling element rolling passages 24 and rolling element return passages extending in parallel to the passages 24 to communicate with each other; and, the rolling element rolling passage 24, rolling element return passage 23 and two curved passages 25, 25 formed on the two ends of the passages 24, 23 cooperate together in forming a rolling element circulation passage which has a substantially annular-ring-like shape. In this rolling element circulation passage, there are rollably loaded a large number of rolling elements 13 which are composed of, for example, steel balls.

In case where the slider 12 assembled to the guide rail 11 is moved in the axial direction of the guide rail 11 along the guide rail 11, the rolling element 13 loaded in the rolling element rolling passage 24 is moved with respect to the guide rail 11 in the same direction as the slider 12 while rolling within the rolling element rolling passage 24. And, in case where the rolling element 13 reaches one end of the rolling element rolling passage 24, the rolling element 13 is scooped up from the rolling element rolling passage 24 by a tongue portion 27 formed in the end cap 12B and is then fed to the curved passage 25.

The rolling element 13 fed into the curved passage 25 is allowed to make a U-turn by the curved passage 25, is introduced into the rolling element return passage 23, passes through the rolling element return passage 23, and reaches the curved passage 25 on the opposite side. Here, the rolling element 13 makes a U-turn again and returns to the rolling element rolling passage 24; and, the rolling element 13 repeats such circulatory motion within the rolling element circulation passage endlessly.

In the connecting portion between the rolling element rolling passage 24 and curved passage 25 of the thus-structured linear guide apparatus, in order to avoid mutual interference between the tongue portion 27 and guide rail 11, a clearance between the rolling element 13 and curved passage 25 is set large. Therefore, when the rolling element 13 moves from the rolling element rolling passage 24 into the curved passage 25, the degree of freedom of the motion of the rolling element 13 is high and the rolling element 13 moves while colliding with or rubbing against a land portion 30 formed in the portion of the guide rail 11 where the groove surface of the rolling element rolling groove 20 of the guide rail 11 and the side surface 11a of the guide rail 11 cross each other.

However, in a linear guide apparatus according to the present embodiment, as shown in FIG. 6, the portion of the guide rail 11, where the groove surface of the rolling element rolling groove 20 of the guide rail 11 and the side surface 11a of the guide rail 11 cross each other, is formed as a curved surface 50 and, in this curved surface 50, the above groove surface and side surface 11a continues with each other smoothly (that is, the land portion 30 is not formed in an angular shape as in the conventional linear guide apparatus but is formed in a curved shape). Due to this, a load, which is applied to the land portion 30 when the rolling element 13 collides with the land portion 30, is relatively small, so that the land portion 30 is made difficult to be damaged, for example, it is difficult to flake or crack; and also, the rolling element 13 is also made hard to be damaged, for example, it is made hard to flake.

The thus-structured linear guide apparatus is ideal for use in a high-speed operation in which the possibility of the rolling element 13 colliding with the land portion 30 is high and a load to be applied to the land portion 30 due to collision of the rolling element 13 with the land portion 30 is large. Also, the present linear guide apparatus is especially ideal not only when the guide rail 11 is made of steel but also when the guide rail 11 is made of ceramic material having high hardness and fragility. In case where the guide rail 11 is made of ceramic material, when the rolling element 13 collides with the land portion 30, the surface of the rolling element 13 is easy to be damaged and the land portion 30 is easy to crack. However, in case where the land portion 30 is formed in a curved shape, occurrence of such damage can be reduced.

Also, in a linear guide apparatus according to the present embodiment, as shown in FIG. 6, the portion of the rolling element rolling groove 20 of the guide rail 11 to be contacted with the rolling element 13 and its neighboring portion, the curved surface portion of the land portion 30, and groove surface of the rolling element rolling groove 20 existing between these two portions (that is, in FIG. 6, the portions which are shown by oblique lines) are respectively structured such that the center line average roughness Ra in the right-angle-direction of the rolling element rolling groove thereof is 0.1 $\mu$m or less.

Therefore, even in case where the rolling element 13 collides with the rolling element rolling groove 20 and land portion 30 as the linear guide apparatus is operated, the rolling element 13 is hard to wear, thereby being able to provide a linear guide apparatus which is excellent in durability.

Now, description will be given below of an example of a method for enhancing the surface roughness of the above-mentioned portions. Firstly, in order to enhance the roughness having a cycle of 5 mm or less of a grinding surface, the portions are tape honed. Further, mainly, to enhance the roughness having a fine cycle of 0.5 mm or less, the portions are lapped and finished using floatation abrasives.

When these finishing operations are enforced on the rolling element rolling groove 20 and land portion 30, in case where a forming backup is used, there is a high possibility that the forming backup can touch only part of the rolling element rolling groove 20 and land portion 30, which raises a fear that there can be left the insufficiently finished portions in the rolling element rolling groove 20 and land portion 30. In order to finish the rolling element rolling groove 20 and land portion 30 in such a manner that the surface roughness thereof is good and uniform, it is necessary to enhance the accuracy of the shape of the backup to a considerable degree.

Figure 7:
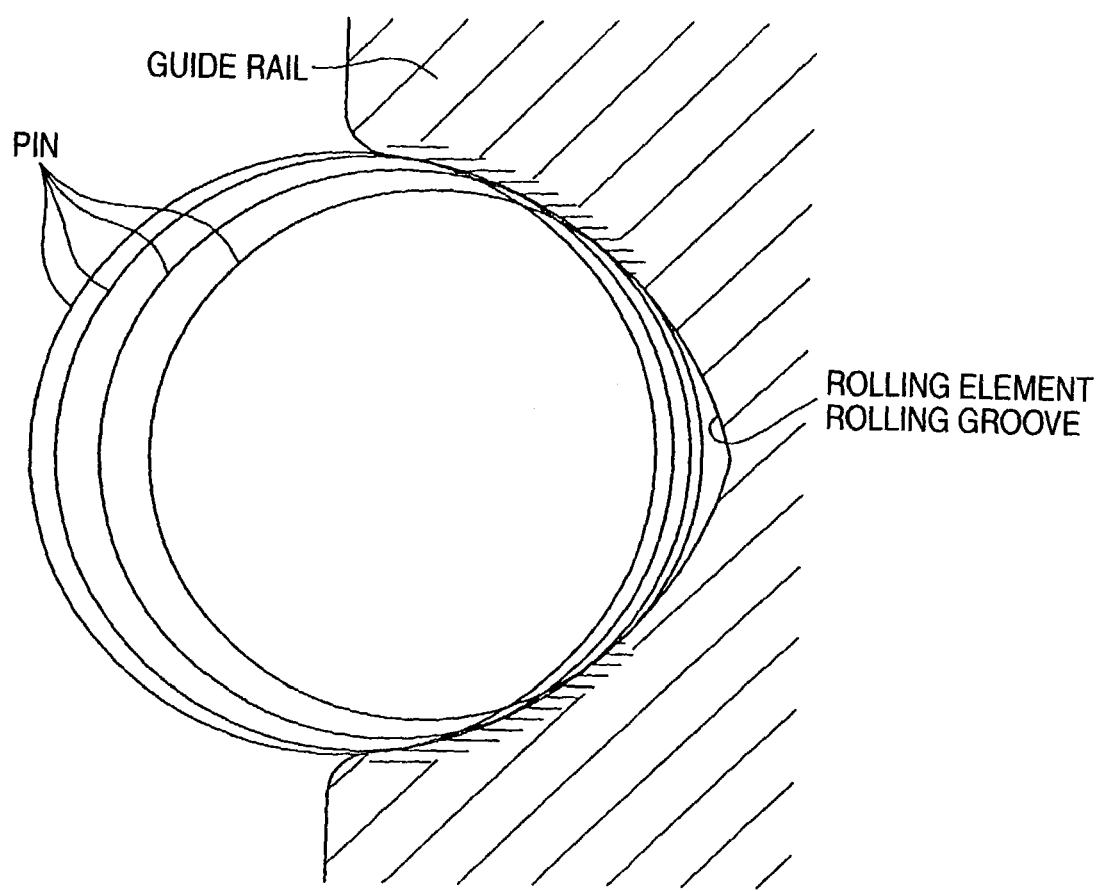
FIG. 7 is an explanatory view of a method for enforcing a finishing operation on the rolling element rolling groove of a guide rail.

To solve these problems, preferably, the above-mentioned finishing operation may be enforced using a plurality of spherical-shaped pins having different diameters. According to this method, as shown in FIG. 7, since the portions to be finished are different according to the diameters of the spherical-shaped pins, a finishing operation can be performed in all portions that must be finished, so that the surface roughness can made uniform and good. By the way, in FIG. 7, oblique lines designate the portions to be finished using a plurality of pins.

(Wear Evaluation Test)

Now, the inventors have conducted a running test on a plurality of linear guide apparatus having substantially the same structure as described above and evaluated the degree of wear of a rolling element.

In the running test, there were used four kinds of linear guide apparatus (embodiments 1, 2 and comparison examples 1, 2) which are different in the lapped portions and the surface roughness of these portions.

That is, in the case of a linear guide apparatus according to an embodiment 1, a lapping finishing operation was enforced only on the portion of the groove surface of a rolling element rolling groove of a guide rail that is contacted with a rolling element, and the center line average roughness Ra of this portion was set for 0.1 $\mu$m.

Also, in the case of a linear guide apparatus according to an embodiment 2, a lapping finishing operation was enforced on the portion thereof ranging from the portion of a rolling element rolling groove of a guide rail to be contacted with a rolling element to the boundary portion between the side surface of the guide rail and the curvedsurface-shaped portion of a land portion, and the center line average roughness Ra of this portion was set for 0.1 μm.

Further, in the case of a linear guide apparatus according to a comparison example 1, a lapping finishing operation was enforced on the same portion thereof as in the embodiment 1, and the center line average roughness Ra of this portion was set for 0.14 μm. Still further, in the case of a linear guide apparatus according to a comparison example 2, a lapping finishing operation was enforced on the same portion thereof as in the embodiment 2, and the center line average roughness Ra of this portion was set for 0.14 μm.

By the way, in all of the linear guide apparatus used in the above test, the width of the guide rail was set for 14 mm, while the number of rolling element rolling grooves formed in the side surface of the guide rail was one on one side.

In the test, these linear guide apparatus were made to run 100 km at the average speed of 1 m/sec. with loading 85N at the average load, and the amounts of wear of rolling elements caused in these running operations were evaluated. The results of the evaluation test are shown in Table 1.

TABLE 1

|  | Center line average roughness Ra (μm) | Wear amounts of rolling elements (μm) |
| --- | --- | --- |
| Embodiment 1 | 0.1 | 0.3 |
| Embodiment 2 | 0.1 | 0 |
| Comparison Example 1 | 0.14 | 0.6 |
| Comparison Example 2 | 0.14 | 0.2 |

When the embodiment 1 and comparison example 1 as well as the embodiment 2 and comparison example 2, which are the same in the lapping finished portion thereof and are different in the center line average roughness Ra, were compared with each other, the embodiments 1, 2 each having a center line average roughness Ra of 0.1 μm were found smaller in the wear amount than their corresponding comparison examples.

Also, when the embodiment 1 and comparison example 1 as well as the embodiment 2 and comparison example 2, which are the same in the center line average roughness Ra and are different in the lapping finished portion, were compared with each other, in both cases, the apparatus, in which a lapping finishing operation was enforced on the portion thereof ranging from the portion of a rolling element rolling groove of a guide rail to be contacted with a rolling element to the boundary portion between the side surface of the guide rail and the curved-surface-shaped portion of a land portion, were found smaller in the wear amounts of rolling elements than the apparatus in which a lapping finishing operation was enforced only on the portion of the groove surface of a rolling element rolling groove of a guide rail that is contacted with a rolling element.

By the way, the present embodiment is an example of the invention and thus the invention is not limited to the present embodiment; and, specifically, the structures of the details of a linear guide apparatus are not limited to those shown in the present embodiment. For example, a method for enhancing the surface roughness is not limited to a lapping method but any other method can be employed, provided that it can set the center line average roughness for 0.1 μm or less.

As has been described hereinbefore, in the case of a linear guide bearing apparatus incorporating therein a composing part according to the invention, there can be provided an effect that it can reduce the progress of wear of the boundary portions between the rolling element rolling grooves and the surfaces that exist continuously with the present rolling element rolling grooves.

As has been described heretofore, according to the linear guide apparatus of the invention, the land portion, which is formed in the portion where the groove surface of a rolling element rolling groove of the guide rail and the outer surface of the guide rail cross each other, is formed as a curved-surface-shaped portion; and, therefore, not only the rolling element rolling groove of the guide rail is difficult to be damaged but also the rolling element is hard to wear.

Also, of the rolling element rolling groove of the guide rail, the portion thereof to be contacted with the rolling element and the land portion are formed so as to have a center line average roughness Ra of 0.1 μm or less, thereby being able to reduce the wear of the rolling element involved with the operation of the linear guide apparatus. Therefore, the invention can provide a linear guide apparatus which is excellent in durability.

What is claimed is:

1. A linear guide apparatus, comprising:
    a guide rail including rolling element rolling grooves formed in the side surfaces thereof so as to extend in the axial direction thereof;
    a slider including rolling element rolling grooves respectively opposed to the rolling element rolling grooves of the guide rail and mounted on the guide rail so as to be movable in the axial direction with respect to the guide rail; and,
    a plurality of rolling elements rollably interposed between the rolling element rolling grooves of the guide rail and the rolling element rolling grooves of the slider,
    wherein each of the portions, where the groove surfaces of the rolling element rolling grooves of either the guide rail or the slider and the outer surfaces thereof cross each other, is formed as a curved surface, whereby the groove surface and the outer surface are allowed to continue smoothly with each other, and
    further wherein a hardness of the groove surfaces and hardness of the outer surfaces are larger than a hardness of a surface of the rolling element.

2. The linear guide apparatus as set forth in claim 1, wherein the groove surfaces of the rolling element rolling grooves and the outer surfaces are formed on the guide rail.

3. The linear guide apparatus as set forth in claim 2, wherein the guide rail is made of ceramic material.

4. The linear guide apparatus as set forth in claim 1, wherein the center line average roughness Ra in the rolling element rolling groove right-angles direction of the portion of the guide rail ranging from the portion of the rolling element rolling groove of the guide rail to be contacted with the rolling element up to the boundary portion between the outer surface of the guide rail and the curved surface is set for 0.1 μm or less.

5. The linear guide apparatus as set forth in claim 3, wherein the center line average roughness Ra in the rolling element rolling groove right-angles direction of the portion of the guide rail ranging from the portion of the rolling element rolling groove of the guide rail to be contacted with the rolling element up to the boundary portion between the outer surface of the guide rail and the curved surface is set for 0.1 μm or less.

6. The linear guide apparatus as set forth in claim 1, wherein the groove surfaces of the rolling element rolling grooves and the outer surfaces are formed on the slider.

* * * * *